(12) United States Patent
Freytag

(10) Patent No.: US 9,834,045 B2
(45) Date of Patent: Dec. 5, 2017

(54) VEHICLE TIRE DEFORMATION DETECTION DEVICE

(71) Applicant: AGCO International GmbH, Hesston, KS (US)

(72) Inventor: Erich Freytag, Sachsenried (DE)

(73) Assignee: AGCO International GmbH, Neuhausen (CH)

( * ) Notice: Subject to any disclaimer, the term of this patent is extended or adjusted under 35 U.S.C. 154(b) by 117 days.

(21) Appl. No.: 14/964,337

(22) Filed: Dec. 9, 2015

(65) Prior Publication Data

US 2016/0167464 A1    Jun. 16, 2016

(30) Foreign Application Priority Data

Dec. 11, 2014  (GB) .................................. 1421989.3

(51) Int. Cl.
*G01M 17/02* (2006.01)
*B60C 23/06* (2006.01)

(52) U.S. Cl.
CPC ........... *B60C 23/064* (2013.01); *G01M 17/02* (2013.01)

(58) Field of Classification Search
None
See application file for complete search history.

(56) References Cited

U.S. PATENT DOCUMENTS

| 5,092,166 A * | 3/1992 | Wada | G01M 17/027 356/71 |
| 5,616,839 A * | 4/1997 | Chen | G01M 17/027 356/71 |
| 2003/0154007 A1 * | 8/2003 | Evans | B60C 23/066 701/514 |
| 2009/0069969 A1 * | 3/2009 | Hammerschmidt | G01M 17/02 701/31.4 |
| 2009/0071237 A1 | 3/2009 | Hammerschmidt et al. | |
| 2009/0118891 A1 * | 5/2009 | Koguchi | B60C 23/064 701/31.4 |
| 2009/0159169 A1 | 6/2009 | Durif et al. | |
| 2009/0243830 A1 | 10/2009 | Heise et al. | |

(Continued)

FOREIGN PATENT DOCUMENTS

| CN | 102320242 A | 1/2012 |
| DE | 10255138 A1 | 6/2004 |
| WO | 2006/054983 A1 | 5/2006 |

OTHER PUBLICATIONS

European Patent Office, International Search Report for Related EP Application No. EP15197863, dated Apr. 11, 2016.

(Continued)

*Primary Examiner* — Andre Allen

(57) ABSTRACT

A vehicle tire deformation device for determining the size of a deformed contact patch of a tire which contacts the ground, said device comprising a movement detector connected to an attachment body by means of a moveable indicator element wherein both the movement detector and the attachment body are attachable to an inside surface of the tire, and wherein the size of the deformed contact patch of the tire is determined by the detector sensing a change in angle of the moveable indicator element indicating the border between the deformed contact patch of the tire and a non deformed part of the tire which is not in contact with the ground.

10 Claims, 3 Drawing Sheets

(56) References Cited

U.S. PATENT DOCUMENTS

| | | | |
|---|---|---|---|
| 2010/0024538 A1* | 2/2010 | Hammerschmidt | .. B60C 23/064 73/146 |
| 2010/0083747 A1* | 4/2010 | Fink | ................... B60C 23/0408 73/146.5 |
| 2010/0147062 A1* | 6/2010 | Wakao | ............... B60C 11/0318 73/146 |
| 2010/0186492 A1* | 7/2010 | Morinaga | ............... B60C 11/24 73/146 |
| 2011/0113876 A1 | 5/2011 | Kammann | |
| 2011/0118989 A1* | 5/2011 | Morinaga | ............... B60C 11/24 702/34 |
| 2014/0338437 A1* | 11/2014 | Mawby | ............. B29D 30/0633 73/146 |
| 2016/0280014 A1* | 9/2016 | Masago | ............... B60C 11/246 |
| 2016/0318356 A1* | 11/2016 | McMillen | ................ G01B 7/06 |
| 2017/0144492 A1* | 5/2017 | Lamgaday | ............ B60C 23/004 |

OTHER PUBLICATIONS

Intellectual Property Office, International Search Report for UK Priority Application No. GB1421989.3, dated May 29, 2015.

* cited by examiner

VEHICLE TIRE DEFORMATION DETECTION DEVICE

BACKGROUND OF THE INVENTION

Field of Invention

This invention relates to a vehicle tire deformation device for determining the size of a deformed contact patch of a tire which contacts the ground. The invention further relates to a method of attaining the optimum tire pressure of a vehicle tire for the terrain and/or speed at which it is travelling by determining the size of a deformed contact patch of the tire when it contacts the ground. When the tire pressure and tire characteristics are known, the axle load can also be indirectly measured.

Description of Related Art

During normal use of an agricultural machine/vehicle, a part of the tire will always be in contact with the ground. This contact part of the tire will be flattened, that is the circumference of the wheel in contact with the ground will spread over the surface of the ground distorting the circular circumference of the tire. The size of the contact patch will depend on the tire pressure and the condition of the ground on which it is travelling, that is the hardness or softness of the ground. In order to improve efficiency and safety of an agricultural machine, or an agricultural vehicle such as an agricultural tractor, it is necessary to change the pressure of the tires depending on whether the tractor is operating, or on the road. When operating in the field, lower tire pressures are required to reduce ground pressure and compaction and to improve the grip of the tires with the earth. For road work, higher tire pressures are required to reduce rolling resistance (which affects the efficiency of the tractor) and to reduce heat generation (which affects the safety of the tractor). For a field of medium softness, a pressure between that of road and soft field is desired, so that the size of contact patch is between that of a soft field and a hard road. The pressures of the tires may typically be varied by 0.6 bar-2.5 bar when moving between field and road surfaces.

Generally, a tire inflation and deflation system comprises at least one rotatable air passage which is provided on, or within an axle to carry air to and from the tires. The rotatable passage may be connected to a further air duct for carrying air. The rotatable passage extends between rigid, stationary parts (which are connected to the vehicle frame, or form a part of the frame, for example an axle housing) and rotating parts (for example, the wheel hubs). Rotating parts such as wheel hubs are equipped with shaft seals to prevent oil from entering the air guiding area of the rotatable passage. Such systems are described in the Applicant's previous UK patent application Nos. GB1021928.5 and GB1021931.9.

It is difficult to measure axle load because axle load sensors are expensive and temperature sensitive.

It is known to use a polymer foil mounted on the inside of an outer tire to measure tire pressure. An example of such a foil is that used by Pd2m GmbH in its "S-Tire". The pressure sensed by one or more foils within the tire can be used by a control system on the vehicle to set the correct tire pressure via a control unit. A change in pressure can be detected by a foil as it rotates through a contact patch. It is an aim of this invention to provide means for detecting the size of a deformed contact patch of a vehicle tire so that the axle load can be calculated. It is a further aim of the invention to provide a method for attaining an optimum tire pressure for the efficient operation of a vehicle depending on the terrain and/or speed upon, and/or at which a vehicle is travelling.

OVERVIEW OF THE INVENTION

In accordance with a first aspect of the invention there is provided a vehicle tire deformation device for determining the size of a deformed contact patch of a tire which contacts the ground, said device comprising a movement detector connected to an attachment body by means of a moveable indicator element wherein both the movement detector and the attachment body are attachable to an inside surface of the tire, and wherein the size of the deformed contact patch of the tire is determined by the detector sensing a change in angle of the moveable indicator element indicating the border between the deformed contact patch of the tire and a non deformed part of the tire which is not in contact with the ground.

This way the size of a contact patch can be measured.

Preferably, the detector continually senses the angle of the indicator element. This way the size of the contact patch is constantly measured and the tire pressure varied accordingly to optimize the economy of the vehicle whilst in use.

Preferably, the device is connected to a vehicle control unit having access to the dimensions of the tire fitted.

The size of portion of tire between the sensed borders is preferably compared with the overall size of the tire and if said portion forms a minor segment of the tire said portion is assigned as a contact patch of the tire and if said portion forms a major segment of the tire, said portion is assigned as a non-contact patch of the tire. In this way the control unit can distinguish between a contact patch and a non deformed part of the tire regardless of when a patch border is detected.

Preferably, the control unit stores the size of the last measured contact patch or non-deformed part of the tire prior to shutdown and compares it to the size of the first measured contact patch or non-deformed part of the tire respectively upon re-start of the vehicle and wherein, if there is a difference in size a warning signal is sent to an operator that there may be a leakage. An increase in contact patch size or a decrease in the non deformed part of the tire indicates a there has been a leak when the vehicle has not been in use.

Advantageously, the vehicle control unit detects the time taken between the detection of a first change in angle and a second change in angle and using the speed of the vehicle calculates the length of the contact patch or the non deformed part of the tire respectively.

The control unit may access dimensions of the tire and calculate the area of the contact or non-deformed part of the tire.

In accordance with a further aspect of the invention, there is provided a method of attaining the optimum tire pressure of a vehicle for the terrain and/or speed at which it is travelling wherein the vehicle tire deformation device determines the size of the contact or non-deformed part of the tire, the control unit compares the size of the contact patch or non-deformed part of the tire with an optimum value from a reference curve of optimum size of contact patch or non-deformed contact part of the tire for different terrains and/or vehicle speeds and if the sensed contact patch or non-deformed contact part is too small or too large, the control unit sends a signal to deflate or inflate the tire.

Preferably, the control unit controls the inflation or deflation of the tire until the optimum contact patch or tire part size is reached.

Preferably, a vehicle operator enters the type of terrain to be traveled over and the appropriate reference curve for the selected terrain type is used for comparison. This way the tire pressure is at the optimum pressure for the type of terrain over which the vehicle is travelling.

Alternatively, or additionally, the control unit monitors the speed of the vehicle and the appropriate reference curve for the speed of travel is used for comparison. This way the tire pressure is at the optimum pressure for the speed of travel.

The vehicle is preferably a tractor.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Figure 1:
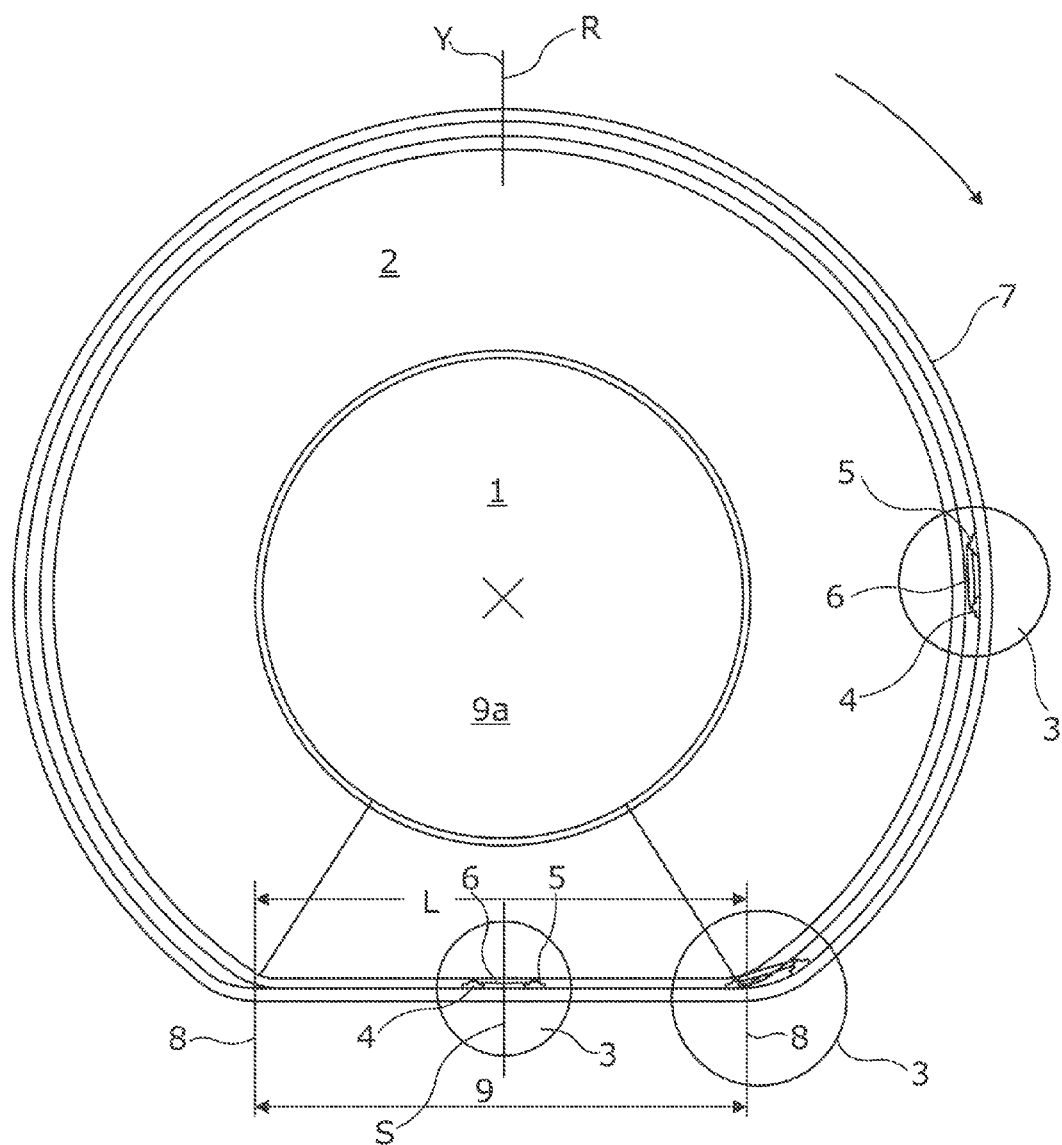
FIG. 1 shows a cross sectional view of a tire provided with a plurality of tire load determination means on the inside in accordance with the invention.

The drawing figures do not limit the present invention to the specific embodiments disclosed and described herein. The drawings are not necessarily to scale, emphasis instead being placed upon clearly illustrating the principles of the preferred embodiment. Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

FIG. 1 shows a cross sectional view of wheel 1 taken a long a line perpendicular to the rotational axis X of the wheel showing the interior of an inflatable tire 2. Tire 2 rotates in a clock wise direction as indicated by the arrow. A reference point R on the tire is used to explain the movement of the tire in relation to FIG. 5. Reference point R rotates from a known position, which is FIG. 1 is shown as being above the tire, along longitudinal axis Y. When point R passes through the known position for a first time, it is noted as being 0°. When point R passes through the known position a second time, the tire is noted as having completed one rotation, that is having rotated through 360°. The wheel is for example, one which is fitted to a tractor or other agricultural machine/vehicle. Typically a vehicle will be provided with a driveshaft which terminates in a hub flange. The wheel comprises a wheel disc attached to the hub flange which carries a wheel rim (not shown) upon which an inflatable tire 2 is fitted. Such tires can have a diameter of up to 2.40 meters and the pressure is often varied by means of a tire inflation system which conveys compressed air from a tractor air supply system via control valves on the tractor to the rotating wheel and via a valve on the wheel to interior of the tire 2. The pressure of the tire is adjusted to take account of the different terrain and speeds at which the tractor travels to enable the tractor to work as efficiently as possible.

For example, when working on soft soil, at a speed below 20 kph, a low tire pressure, for example, 0.8 bar, is preferred since it increases the contact area of the tire with the soil and reduces the pressure on the soil, thus reducing unnecessary sinking into the soil. On hard surfaces, such as roads, where the tractor will travel over 20 kph, a high tire pressure is preferred which minimizes the contact area of the tire with the road and thus reduces wear of the tires. A high tire pressure will also minimize the roll of the tractor which economizes fuel consumption. A tire pressure between a high and low pressure is preferred for a surface having a hardness between that of soft soil and a road.

As is shown in FIG. 1, the circumference 7 of the tire flattens when it comes into contact with the ground and forms a contact patch 9. The size of the contact patch depends on the tire pressure; the lower the pressure the larger the area of the contact patch. The higher the pressure, the smaller the area of the contact patch. The size of the largest contact patch is restricted by the hub 9a, so the contact patch will always form a minor segment of the tire. The area of the contact patch 9 can be thought of as a rectangle wherein its dimensions are defined by the width of the tire, W and the length of the arc of the tire which is flattened against the ground, L. The length of the arc L is defined by borders 8 at each end which as viewed in FIG. 1 is where in cross section, the flattened part of the arc meets the undeformed tire circumference. The width of the tire, W is mainly unchanged by the tire pressure, since it is that length of the arc of the tire which is in contact with the ground which changes depending on the tire pressure. The remainder of the circumference of the tire, that is the major segment of the tire which is not in contact with the ground at a particular moment in time is referred to as the non deformed part of the tire.

Figure 2:
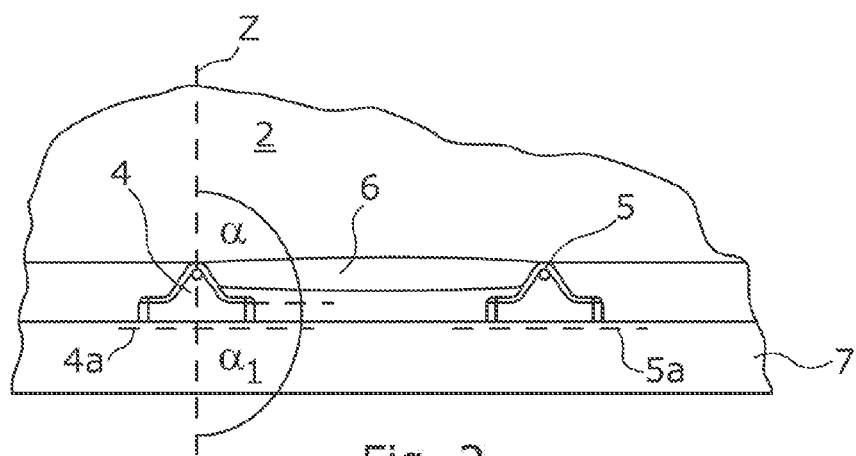
FIGS. 2 to 4 show a close up of each of the tire load determination means of FIG. 1.
Figure 3:
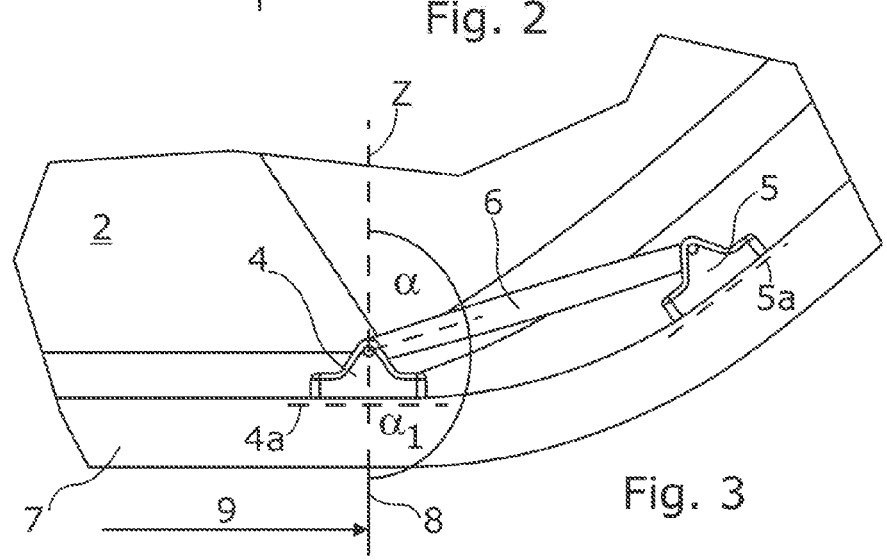
Figure 4:
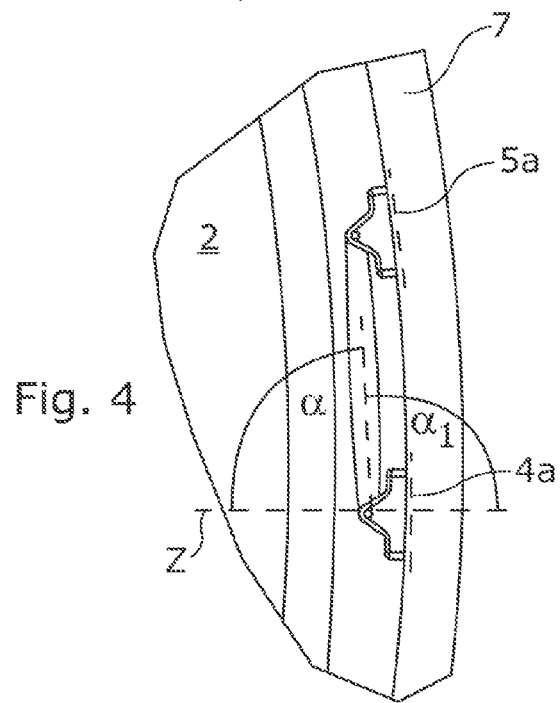

In accordance with the invention, the inside of the tire is provided with a tire deformation device 3. In FIG. 1, three deformation devices 3 are shown. The invention will work with just one device, however the more devices 3 which are fitted the greater is the accuracy and for good accuracy, it is recommended that more than two devices 3 are fitted. Each device 3 comprises a movement detector 4 and an attachment member 5 which are connected by an indicator element 6. The detector 4 and attachment member 5 are attached spaced apart at the same radius to the inside surface of the tire 2 by gluing means. Indicator element 6 is rigid and pivotably attached to movement detector 4 and attachment member 5 so that it can pivot about axes which are parallel to the rotational axis X of the wheel 1. The device 3 is therefore able to detect an appreciable difference between the plane of the surface 5a to which the attachment member 5 is attached relative to the plane of the surface 4a to which the detector 4 is attached, since the indicator element 6 will move by pivoting about its connections with the movement detector 4 and attachment member 5 respectively. As shown in FIGS. 2 to 4, any difference between the two planes of surfaces 4a and 5a is determined by measuring the angle of slope of indicator element 6 at either the movement detector 4, or the attachment member 5 relative to a reference point. In FIGS. 2 to 4 a reference point Z which is perpendicular to the base of detector 4 is chosen. Indicator element 6 is short, so that the detector 4 and attachment member 5 are connected close together. An appreciable difference between the planes of the surfaces 4a and 5a, for example, would be an obtuse angle of greater than 90°, or an acute angle of less than 90°.

FIGS. 2 to 4 are close up views of the deformation devices 3 shown in FIG. 1.

In FIG. 2, the detector 4 and attachment member 5 of each device 3 are both located on the inside surface of the contact patch 9 in the same plane. Angle α, or α1 measured at the attachment member 5 between the reference point Z and the indicator element 6 is approximately 90° showing that surface 4a and surface 5a are in the same plane.

In FIG. 4, both the detector 4 and attachment member 5 are located on the inside surface of a non deformed part of the tire 2, that is, both the detector 4 and the attachment member 5 are located outside of the contact patch 9. Angle α and/or α1 is approximately 90° indicating that there is no appreciable difference between the planes of surfaces 4a and 5a. Although there may be a slight difference between the planes of the surfaces 4a and 5a, it is not detected as being an appreciable difference because of the short length of the indicator element 6.

In FIG. 3, the detector 4 is located on the contact patch and the attachment member 5 is located on a non deformed part of the tire 2. Angle α is less than 90°, and α1 is greater than 90° giving rise to the detection of an appreciable difference between the plane of surface 4a relative to the plane of surface 5a and thus indicating the border 8 of a contact patch 9.

It can be seen that as the tractor moves, so the wheel 2 rotates and the tire deformation device or devices 3 can detect where there is an appreciable change between the planes of surfaces 4a and 5a to which the attachment means 5 and detector 4 are attached. This thus determines where the borders 8 of the contact patch 9 are.

Figure 5:
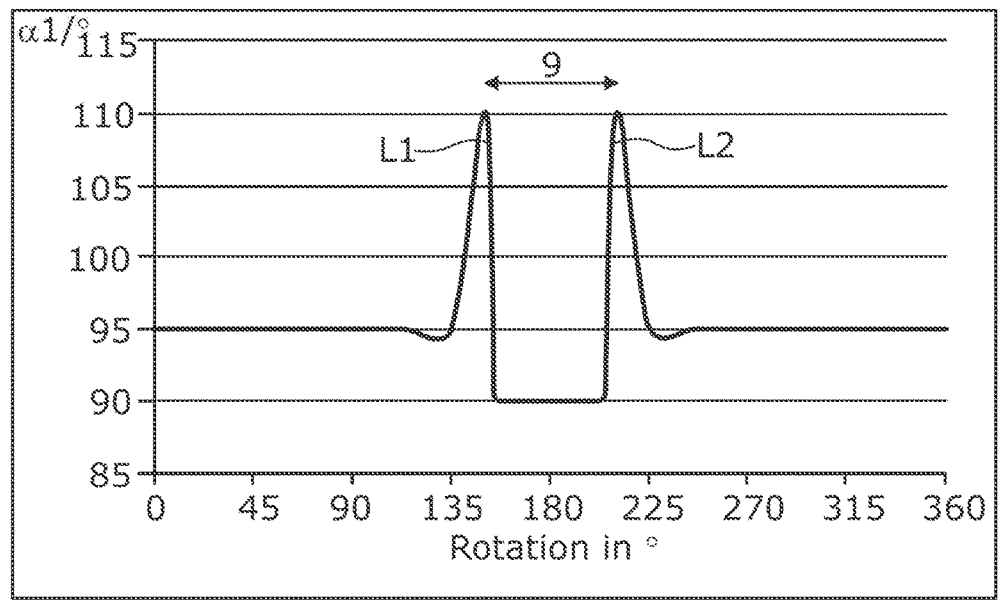
FIGS. 5 to 6 each show a graph representing the change in angle of a determination means of FIG. 1 as the tire completes one revolution.

FIG. 5 shows the change in angle α1 of the indicator 6 as the tire of FIG. 1 is rotated. As the tire is rotated from reference point R through 150° there is no appreciable difference between the planes of surfaces 4a and 5a and as a result, the angle α1 between the indicator 6 and the reference point of movement detector 4 or attachment member 5 is approximately 90°. When the tire has rotated through 150°, there is an appreciable difference between the planes 4a and 5a and the angle α1 between the indicator 6 and the reference point of movement detector 4 or attachment member 5 exceeds 90°, for example the angle is 110° as shown in FIG. 5. This first increase L1 in angle α1 represents the beginning of tire patch 9. As the tire further rotates from 150° to 210°, angle α1 is 90° as there is no appreciable difference between planes 4a and 5a. When the tire has rotated through 210°, there is again an appreciable difference between the planes 4a and 5a and angle α1 increases so that there is a second increase L2 in α1 again exceeding 90° which is shown in FIG. 5 as 110. This second increase represents the end of the tire patch 9, allowing the length of arc L which is flattened to be calculated. Further rotation of the tire from 210° to 360° results in angle α1 being approximately 90° again.

Typically, the speed of rotation of the wheels is measured by a tractor control unit and each device 3 will continuously send time measured angle values to the control unit so that the length of the arc L which is flattened can be calculated. If the value of arc L is known and the value of the width of the tire, W is known, the area of the contact patch can also be calculated by the formula L*W.

Figure 6:
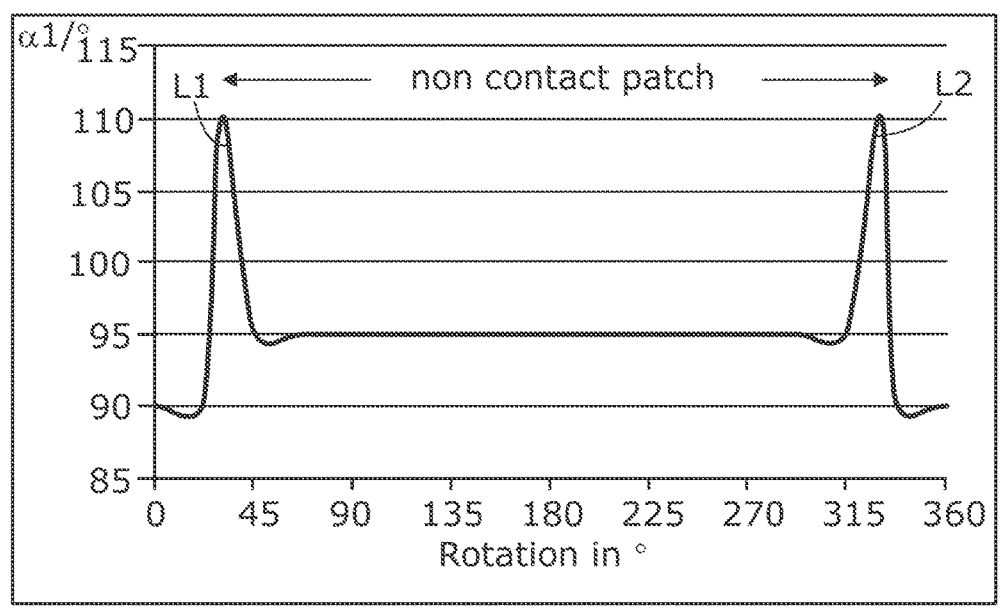

It can be seen that if the angle measurements are started when the device 3 is within the contact patch 9, for example, at point S in FIG. 1 that the first and second change of angle measurements will relate to the end and the beginning of the contact patch 9 respectively (rather than the beginning and the end of the patch). This situation is shown in FIG. 6 where the reference point S is rotated less than 45° when a first increase L1 in angle α1 of 110° is measured. As the wheel rotates through 45° angle α1 is approximately 95° until it the tire is rotated just over 315° when a second increase L2 in angle α1 of 110° is measured again. These measurements lead to the size of the contact patch 9, or arc L being calculated using a major segment of the tire rather than the minor segment of the tire resulting in a contact patch size which is larger than the rest of the tire which is not in contact with the ground. Owing to the hub cap 9a, the length of arc L can never be greater than the portion of the circumference of the tire which is not in contact with the ground, That is, the contact patch 9 will never be a major segment of the tire. The tractor control unit will have access to the dimensions of the tire fitted and will thus be able to determine that where the readings indicate that the size of the contact patch 9 is a major part of a tire, rather than a minor part of the tire that the readings taken are not those of the contact patch 9. In such a case, the size of the contact patch 9 can be calculated by subtracting the size of the measured tire part from the overall size of the tire. Alternatively, the control unit can ignore the first reading L1 and instead use the second reading L2 as being the beginning of the contact patch 9. A further reading at the next increase in angle α1 will indicate the end of the contact patch 9 and thus arc L can be calculated. In accordance with a further aspect of the invention a comparison reference curve for a tire of known width, W showing the desired size of compact patch for a given speed for a given terrain which results in the optimum pressure for that speed is stored in the control unit. As the speed of the tractor and size of contact patch is measured, so the control unit compares the measured values with those of the reference curve. If the pressure should be increased (that is the size of the contact patch should be decreased) the control unit sends a message to the inflation system to inflate the tire, and/or show the operator a warning on the control unit that the tire pressure should be increased. Likewise, if the tire pressure should be decreased (size of the contact patch 9 should be increased) the system will vent air from the tires, and/or warn the operator that this is the case.

Further still, the control unit stores the last measured contact patch size prior to shutdown of the tractor and compares it to the first measured contact patch size upon re-start of the tractor and if there is a difference in contact patch the control unit sends a warning signal to an operator that there may be a leak in the tire.

With this device, axle sensors are not required and therefore costs in installing such sensors are avoided.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

The invention claimed is:

1. A vehicle tire deformation device for determining the size of a deformed contact patch of a tire which contacts the ground, said device comprising a movement detector connected to an attachment body by a moveable indicator element wherein both the movement detector and the attachment body are attachable to an inside surface of the tire, and the detector continually senses the angle of the indicator element and wherein the size of the deformed contact patch of the tire is determined by the detector sensing a change in angle of the moveable indicator element indicating the border between the deformed contact patch of the tire and a non deformed part of the tire which is not in contact with the ground, said device connected to a vehicle control unit having access to the dimensions of the tire fitted.

2. A vehicle tire deformation device as claimed in claim 1 wherein the size of a portion of tire between the sensed borders is compared with the overall size of the tire and if said portion forms a minor segment of the tire, said portion is assigned as a contact patch of the tire and wherein, if said portion forms a major segment of the tire, said portion is assigned as a non deformed part of the tire.

3. A vehicle tire deformation device as claimed in claim 2 wherein the control unit stores the size of the last measured contact patch or non deformed part of the tire prior to shut down and compares it to the size of the first measured contact patch or non deformed part of the tire respectively upon re-start of the vehicle and wherein, if there is a difference in size a warning signal is sent to an operator that there may be a leak.

4. A vehicle tire deformation device as claimed in claim 1 wherein the vehicle control unit detects the time taken between the detection of a first change in angle detection and a second change in angle of the indicator element and using the speed of the vehicle calculates the length of the contact patch or non deformed part of the tire respectively.

5. A vehicle tire deformation device as claimed in claim 1 wherein dimensions of the tire are accessed from the control unit and the control unit calculates the area of the contact patch or non deformed part of the tire.

6. A vehicle tire deformation device as claimed in claim 1 wherein the vehicle is a tractor.

7. A method of attaining the optimum tire pressure of a vehicle for the terrain and speed at which the vehicle is travelling, the method comprising:
   determining the size of a contact patch or non-deformed part of a tire with a vehicle tire deformation device;
   comparing the size of the contact patch or non-deformed part of the tire with an optimum value from a reference curve of optimum sizes of contact patch or non-deformed contact part of the tire for different terrains and vehicle speeds using a control unit; and
   deflating the tire if the sensed contact patch or non-deformed contact part is too small or inflating the tire if the sensed contact patch or non-deformed contact part is too large by sending a signal from the control unit.

8. The method of attaining the optimum tire pressure of a vehicle as claimed in claim 7 further comprising controlling the inflation or deflation of the tire with the control unit until an optimum size is reached.

9. The method of obtaining an optimum tire pressure as claimed in claim 7 further comprising having a vehicle operator enter the type of terrain to be traveled over and the appropriate reference curve for the selected terrain type to be used for comparison.

10. The method of obtaining an optimum tire pressure as claimed in claim 7 further comprising monitoring the speed of the vehicle and the appropriate reference curve for the speed of travel to be used for comparison with the control unit.

* * * * *